Dec. 15, 1959  O. R. RITTENHOUSE ET AL  2,916,945
STEERING GEAR
Filed March 24, 1958  2 Sheets-Sheet 1

INVENTORS
Owen R. Rittenhouse
& Earl W. Glover
BY E. W. Christen
ATTORNEY

Dec. 15, 1959     O. R. RITTENHOUSE ET AL     2,916,945
STEERING GEAR
Filed March 24, 1958     2 Sheets-Sheet 2
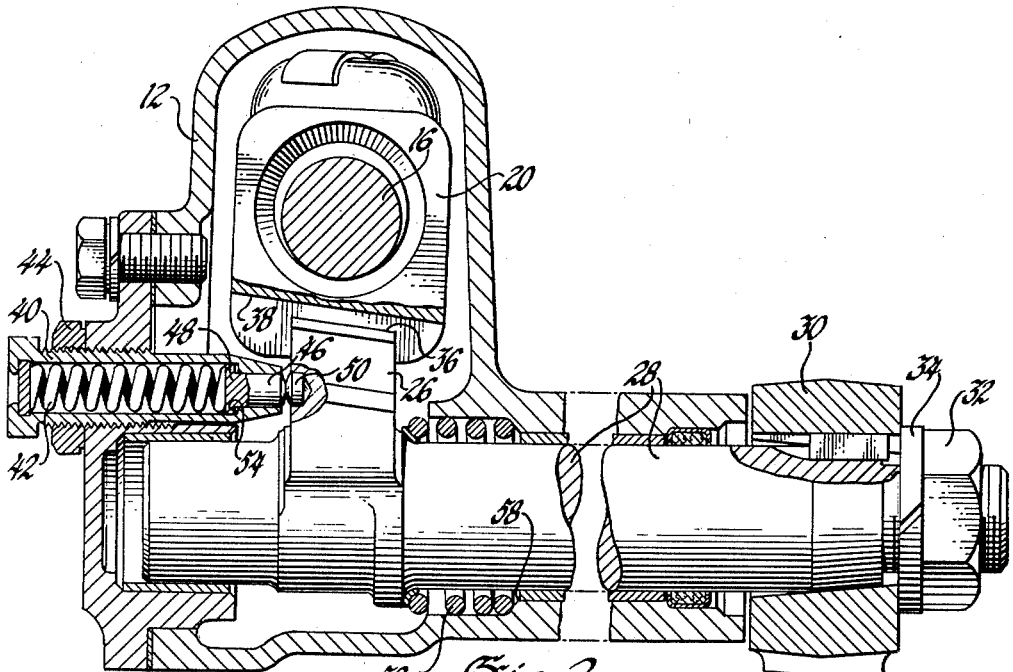
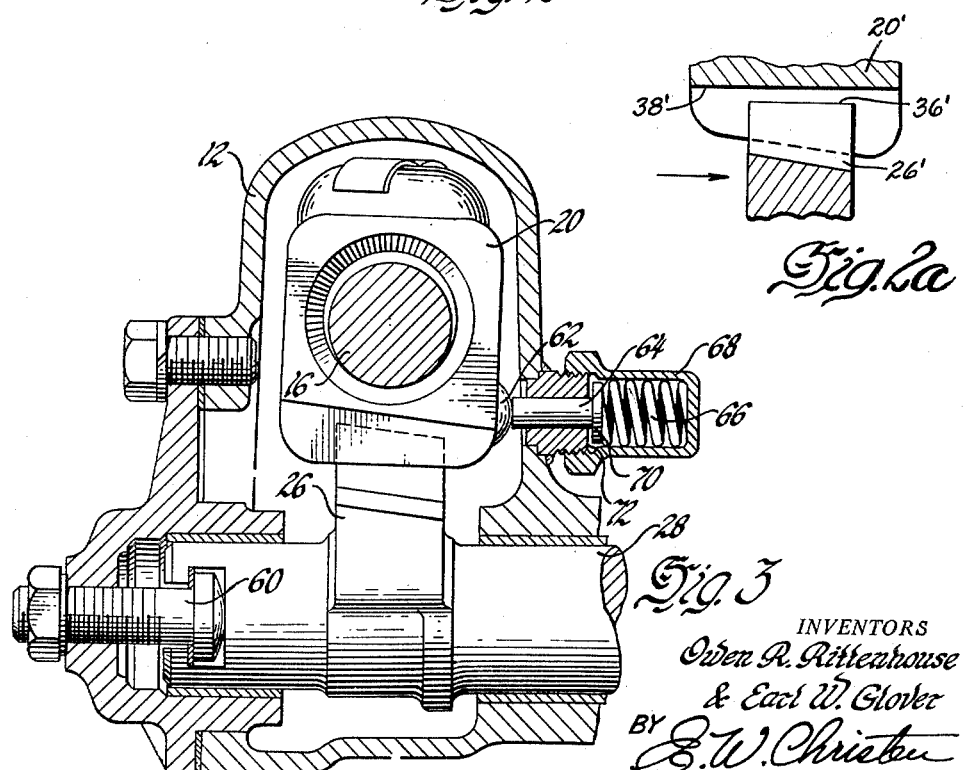
INVENTORS
Owen R. Rittenhouse
& Earl W. Glover
BY E. W. Chrieten
ATTORNEY

United States Patent Office 2,916,945
Patented Dec. 15, 1959

2,916,945

STEERING GEAR

Owen R. Rittenhouse and Earl W. Glover, Saginaw, Mich., assignors to General Motors Corporation, Detroit, Mich., a corporation of Delaware Application March 24, 1958, Serial No. 723,578

9 Claims. (Cl. 74—499)

This invention relates to a ball nut steering gear having improved operating characteristics.

In such a gear it is important that the rack teeth of the nut engage the teeth of the gear sector substantially without lash when the nut and sector are in centered relation. This renders the gear more responsive through the center area, as is desirable, and provides a braking action preventing over-shooting on the reverse movement of the steering parts brought about by the geometry of the steering linkage. As generally understood, the steering linkage in effect winds up with storage of energy as the steering wheel is turned, the stored energy being expended in the reverse movement of the parts.

It is further important in a ball nut steering gear that there be a substantial amount of lash between the nut and sector teeth when the nut and sector are off-center, since this facilitates initiation of the reverse action just mentioned.

The principal objects of the invention being implicit in the foregoing, the same will now be specifically described in terms of a preferred embodiment thereof illustrated by the accompanying drawings in which:

Figure 2 is a view on the line 2—2 in Figure 1; and

Figure 2a shows a modification of the sector and rack teeth.

Figure 3 shows a modification.

Figure 1:
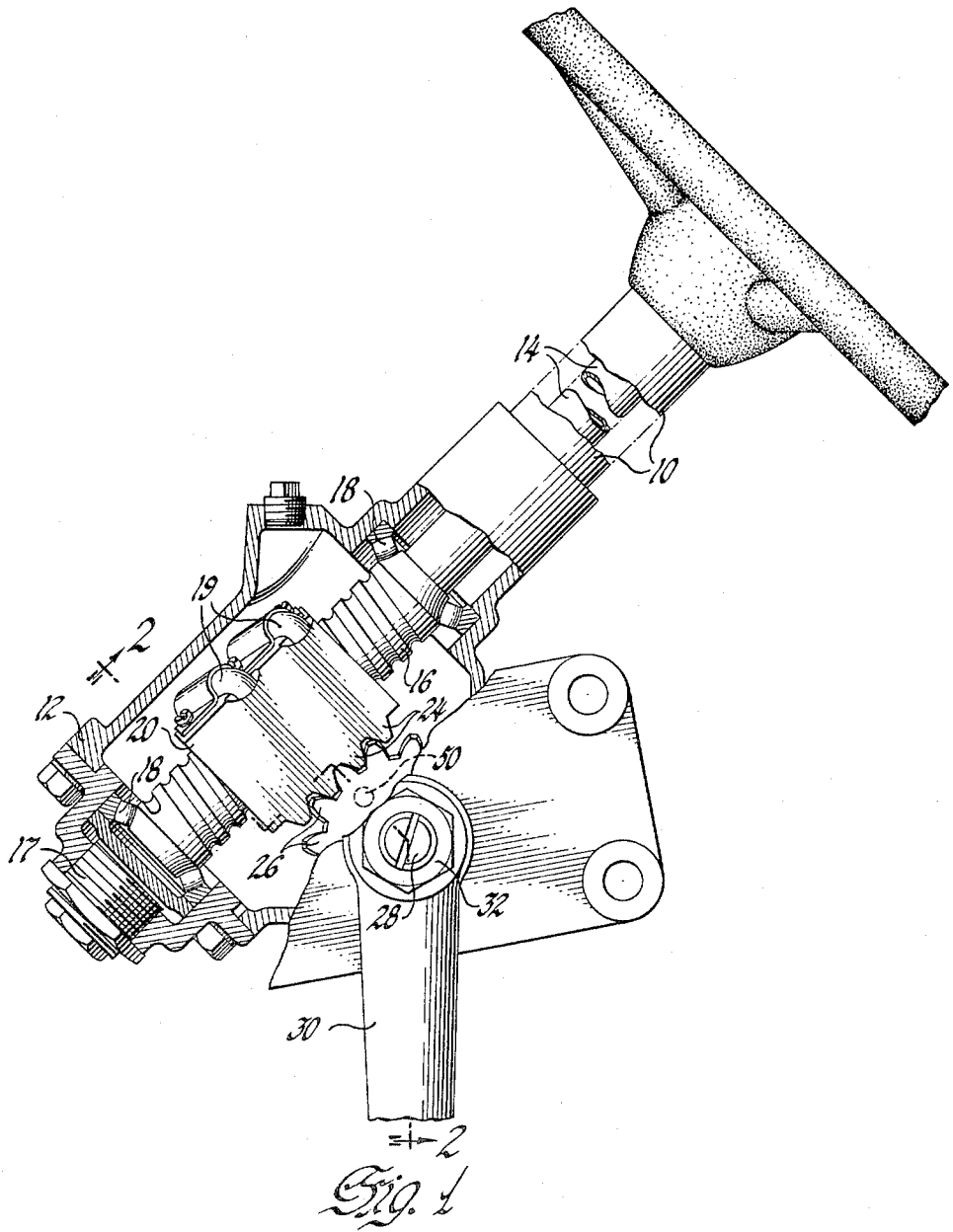
Figure 1 is a longitudinal section through the gear box, the nut and sector being shown in side elevation.

Referring first to Figure 1, the numeral 10 denotes the steering column which is suitably fixed to the gear casing 12 and houses the steering shaft 14. The latter mounts the usual steering wheel at its upper end and terminates within the casing 12 in a worm 16 which turns in thrust bearings 18 preloaded by an adjustor 17.

Worm 16 carries a ball nut 20 which moves axially of the worm on rotation of the steering shaft 14. Such a nut will be found described in detail in Hawkins Patent 2,267,524. Suffice it to say here that the connection between the worm and nut is made through two ball trains, travelling helical courses set by the worm groove and a complementary groove formed internally of the nut. Transfer tubes 19 provide for recirculation of the balls.

Nut 20 comprises rack teeth 24 meshing with the teeth of a gear sector 26. This sector is integral with a pitman-operating shaft 28 (Figure 2) shown as keyed to the pitman arm 30. A nut 32 threaded onto the shaft 28 and maintained tight by a lock washer 34 secures the pitman arm.

It is to be noted that the edges 36 of the gear sector teeth are pitched or canted in a manner complementary to the root 38 of the rack teeth carried by the ball nut. With this arrangement, it should be clear that rightward displacement of the sector along the line of its axis is accompanied by reduction in the lash between the two sets of teeth. The gear sector teeth may be described as being formed on the side of a segment of a cone as opposed to the side of a segment of a cylinder. If desired, the tooth formation may be reversed, i.e., the rack teeth of the ball nut may be generated on the side of a segment of a cone, in which event only the root of the sector teeth need be canted. This is illustrated by Figure 2a wherein primed numerals are employed to denote the parts identified by the corresponding unprimed numerals in Figure 2.

To attain the lash characteristics hereinbefore mentioned, there is threaded into the casing 12 a capsule-like housing 40 for a spring 42. This spring reacts against the casing 12 through the housing 40, which is secured in place by an adjustor nut 44, and loads a plunger 46 flanged at 48. A button 50, fixed substantially centrally of the face of the sector, is engaged by the plunger 46 when the sector and nut attain centered relation corresponding to the straight ahead position of the dirigible wheels of the vehicle to which the gear is applied. The engagement of the plunger with the nut brings about rightward axial displacement of the sector and the taking up of the lash between the mating teeth. With the nut and sector off-center, that is with plunger 46 and button 50 out of engagement, spring 42 tends to force the plunger rightward to a point where flange 48 contact shoulder 54.

A spring 56 reacting against the housing 12 through a shoulder 58 tends to displace the gear sector 26 axially leftward, so that with the ball nut and sector off-center, the lash between their mating teeth is determined by the spring 56 in conjunction with the spring-loaded plunger 46 which then acts as a stop. As indicated, spring 42 is relatively stronger than spring 56, the force of which it overcomes to effect the tightening of the mating teeth as the sector and nut attain centered relation.

Going now to Figure 3, here the desired lash condition, when the nut and gear sector are off-center, is achieved by a conventional adjustor 60, the operation of which is believed obvious. To produce the desired no-lash condition with the parts centered, the nut 20 is provided with a button 62 located on the side of the nut at a point equidistant from the end teeth thereof and preferably just upward of the root line of the teeth. As the nut and sector attain centered relation, a plunger 64 loaded by a spring 66 encased in a housing 68, suitably fixed to the gear casing 12, engages the button to shift the nut laterally leftward. When the nut and sector are off-center, the plunger 62 is kept from contacting the side of the nut by engagement of the flange 70 with the wall 72.

What is claimed is:

1. A steering gear or the like comprising, within a housing, a gear sector rocked through a racked nut carried by a steering worm, the mating teeth of the sector and nut being adapted for reduction in the lash therebetween on displacement of one of said sector and nut in a direction normal to the axis of the worm, means providing a high point on said one of said sector and nut, and means supported by said housing and engaging said high point to effect the indicated displacement when the sector and nut attain centered relation.

2. A steering gear or the like comprising, within a housing, a gear sector rocked through a racked nut carried by a steering worm, the mating teeth of the sector and nut being adapted for reduction in the lash therebetween on displacement of one of said sector and nut in a direction normal to the axis of the worm, means providing a high point on a face of said sector, and means engaging said high point to effect the indicated displacement when the sector and nut attain centered relation, said last means reacting against said housing through yieldable means associated therewith.

3. A steering gear or the like comprising, within a housing, a gear sector rocked through a racked nut carried by a steering worm, the mating teeth of the sector and nut being adapted for reduction in the lash therebetween on displacement of one of said sector and nut in a direction normal to the axis of the worm, means providing a high point on a side of said nut, and means engaging said high point to effect the indicated displacement when the sector and nut attain centered relation, said last means, reacting against said housing through yieldable means associated therewith.

4. A steering gear or the like comprising, within a housing, a gear sector rocked through a racked nut carried by a steering worm, the mating teeth of the sector and nut being adapted for reduction in the lash therebetween on displacement of one of said sector and nut in a direction normal to the axis of the worm, means providing a high point on one of said sector and nut, means supported by said housing and engaging said high point to effect the indicated displacement when the sector and nut attain centered relation, means associated with said last means limiting the extent to which it may displace said sector, and means supported by said housing and acting against said one of said sector and nut in opposition to said second-recited means, said oppositely-acting means tending to increase the lash between said teeth and exerting a relatively weaker force than said second-recited means but, within the limits set by said second-recited means, determining the lash between said teeth when said sector and nut are off-center.

5. A steering gear or the like comprising, within a housing, a gear sector rocked through a racked nut carried by a steering worm, the mating teeth of the sector and nut being adapted for reduction in the lash therebetween on displacement of said sector in a direction normal to the axis of the worm, means providing a high point on a face of said sector, means supported by said housing through yieldable means associated therewith and engaging said high point to effect the indicated displacement when the sector and nut attain centered relation, means limiting the extent to which said last means may displace said sector, and yieldable means supported by said housing and acting against said sector in opposition to said second-recited means, said last yieldable means being overcome by the force of said first yieldable means on engagement of said second-recited means with said high point but otherwise determining the last between said teeth within limits set by said second-recited means.

6. A steering gear or the like comprising, within a housing, a gear sector rocked through a racked nut carried by a steering worm, the teeth of at least one of said sector and nut being formed on the side of a segment of a cone as opposed to the side of a segment of a cylinder whereby on displacement of one of said sector and nut in a direction normal to the axis of the worm the amount of lash between the sector and nut is reduced, a button fixed to one of said sector and nut to provide a high point thereon, a spring-loaded plunger carried by means fixed to said housing and engaging said button to effect the indicated displacement when the button carrying part reaches its centered position.

7. A steering gear or the like comprising, within a housing, a gear sector rocked through a racked nut carried by a steering worm, the teeth of at least one of said sector and nut being formed on the side of a segment of a cone as opposed to the side of a cylinder whereby on displacement of said sector and nut in a direction normal to the axis of the worm the amount of lash between the sector and nut is reduced, a button fixed to a face of said sector substantially centrally of such face, said button providing a high point on said face, a spring-loaded plunger carried by means fixed to said housing and engaging said button to effect the indicated displacement when the sector reaches its centered position.

8. A steering gear or the like comprising, within a housing, a gear sector rocked through a racked nut carried by a steering worm, the teeth of at least one of said sector and nut being formed on the side of a segment of a cone as opposed to the side of a segment of a cylinder whereby on displacement of said nut in a direction normal to the axis of the worm the amount of lash between the sector and nut is reduced, a button fixed to a side of said nut in close proximity to the root line of the teeth thereof and at a point equidistant from the end teeth of the nut, a spring-loaded plunger carried by means fixed to said housing and engaging said button to effect the indicated displacement when the nut reaches its centered position on the worm.

9. A steering gear or the like comprising, within a housing, a gear sector rocked through a racked nut carried by a steering worm, the teeth of at least one of said sector and nut being formed on the side of a segment of a cone as opposed to the side of a segment of a cylinder whereby on displacement of said sector in a direction normal to the axis of the worm the amount of lash between the sector and nut is reduced, a button fixed to a face of said sector to provide a high point thereon, a spring-loaded plunger supported by said housing and engaging said button to effect the indicated displacement when the sector and nut attain centered relation, stop means limiting the extent to which said plunger may displace said sector, and spring means supported by said housing and acting against said sector in opposition to said spring-loaded plunger, said spring means being overcome by the force of said spring-loaded plunger on engagement thereof with said button but otherwise determining the lash between said sector and nut within limits set by said spring-loaded plunger.

References Cited in the file of this patent

UNITED STATES PATENTS

| | | |
|---|---|---|
| 2,034,944 | Griswold | Mar. 24, 1936 |
| 2,267,524 | Hawkins | Dec. 23, 1941 |
| 2,688,260 | Muller | Sept. 7, 1954 |